UNITED STATES PATENT OFFICE.

OTTO VOIGTLÄNDER, OF ESSEN-ON-THE-RUHR, GERMANY.

PROCESS FOR PRODUCING HOMOGENEOUS ARTICLES OF ANY DESIRED FORM OUT OF PURE TUNGSTEN.

1,224,242.     Specification of Letters Patent.     Patented May 1, 1917.

No Drawing.     Application filed March 22, 1913. Serial No. 756,214.

*To all whom it may concern:*

Be it known that I, OTTO VOIGTLÄNDER, manufacturer, citizen of the German Empire, residing at Essen-on-the-Ruhr, Germany, have invented certain new and useful Improvements in Processes for Producing Homogeneous Articles of Any Desired Form Out of Pure Tungsten, of which the following is a specification.

As is well known tungsten is chiefly precipitated out of its ores by caustic potash and converted into $WO_3$. The oxid is reduced to metal by heating in the presence of carbon or a current of hydrogen. By so doing a metal powder of a greater or lesser degree of purity is obtained.

Heretofore no process was known which enabled pure tungsten to be produced in homogeneous pieces of any desired size, for which reason it was rendered difficult to use this metal for technical purposes in spite of its great degree of hardness and of its extremely high melting point. Tungsten is used in powder form chiefly for alloying purposes.

When however small quantities of homogeneous tungsten were required for certain purposes it was usual to subject $WO_3$ or an oxid containing but little O to a high pressure so as to form rods or other shapes, whereupon the bodies so formed were further reduced in a current of hydrogen, and finally said bodies were heated as high as possible by the electric current, in order to cause the powder to unite.

Apart from the fact that this process, being too expensive, cannot be used for most purposes, it is only possible to use the same for making articles of very small section, because the strength of current required for uniting or sintering the same increases with the section which is accordingly restricted to a few millimeters.

Tungsten has indeed been successfully introduced into cast-iron, steel, gun-metal thus to produce alloys of tungsten by means of the aluminium thermic process (see Minet, *Die Gewinnung des Aluminiums* 1902, page 122, published by Wilhelm Knappe, Halle on the Saale, Germany), but the production of pure tungsten in homogeneous pieces was not successful. Further the experiments carried out by Stavenhagen, Borchers, Weiss Martin (see Mennicke, *Metallurgie des Wolframs*, 1911, pages 194-195 published by M. Krayn, Berlin, Germany) did not lead to any solution of the problem of producing homogeneous tungsten in pieces of any desired size, not even by using the aluminium thermic process.

The tungsten bodies obtained by said experiments were either too small or too porous to be used, or the product was not pure.

The experiments made by Borchers (see Mennicke, *supra*, page 195) to mix a mixture of $WO_3$ and Al with $\frac{1}{4}$ columetric parts of liquid air for the purpose of increasing the temperature of the reaction and igniting said mixture, only resulted in but small quantities of reguline tungsten.

By detailed experiments the inventor of the present process has ascertained that the heat produced in the reaction of the mixture of $WO_3$—Al when ignited suffices to reduce $WO_3$, but the quantity of heat produced thereby does not even approximately suffice in order to evaporate or dissolve all auxiliary or foreign substances and to melt the metal powder into a homogeneous body.

These experiments resulted in the new process.

This process is characterized by a mixture consisting, for example, of $WO_3$ and Al being placed in a tube or receptacle of any desired form, which is burnt in a furnace of any suitable construction, heated to as high a degree as possible, so that by the heat of reaction of the mixture combined with the heat of the furnace the metal is separated from the foreign particles contained therein and it is completely melted so as to form a homogeneous body.

This process enables the production of articles of pure homogeneous tungsten having a weight amounting to many kilograms, which can then be wrought, pressed or worked in any other manner suitable for the purpose.

As, according to the new process, the form of the article is only dependent upon the form of the receptacle in which the mixture is introduced into the furnace, articles which do not require any or but little finish, such as crucibles, etc., can be produced at once. I believe I am the first to produce founded or cast tungsten, or to make any cast article of tungsten.

In carrying out the new process the oxidation of the finished article can be avoided by a current of indifferent gas being passed through the receptacle in which the metal is placed when introduced into the furnace. It has already been proposed in carrying out the aluminium thermic process to heat the reacting substance in a crucible or furnace from the outside until the reaction takes place. But this proposal only related to the introduction of the reaction by outside heating in producing reguline chromic metal.

By the new process not only $WO_3$ but all other lower oxids can be worked into pure homogeneous metal, only the requisite quantity of the aluminium to be added having to be determined.

What I claim and desire to secure by Letters Patent of the United States is:—

1. The process of producing metallic tungsten in homogeneous form, which comprises reacting on an oxid of tungsten with metallic aluminium in the presence of heat sufficient to reduce the oxid to compact metal and melt the metal, said heat being in addition to the heat of reaction.

2. The process of producing metallic tungsten in homogeneous form, which comprises reacting on the trioxid of tungsten with metallic aluminium while subjecting the reacting mixture during the entire reaction to a high degree of external heat sufficient to melt the metal.

3. The process of producing solid tungsten metal, which comprises placing a mixture of tungsten oxid and metallic aluminium in a suitable receptacle and heating the receptacle to a high temperature the heat of the receptacle and the heat of reaction being sufficient to melt the reaction product to a regulus taking the form of the receptacle.

4. The process of producing solid tungsten metal, which comprises reacting on an oxid of tungsten with metallic aluminium in a non-oxidizing atmosphere while supplying a high degree of heat during the reaction, and in addition to that developed by the reaction, sufficient to melt the tungsten into a solid regulus of pure tungsten metal.

In testimony whereof I affix my signature in presence of two witnesses.

OTTO VOIGTLÄNDER. [L. S.]

Witnesses:
 HELEN NUFER,
 ALBERT NUFER.